United States Patent
Yamamoto et al.

(10) Patent No.: US 9,836,011 B2
(45) Date of Patent: Dec. 5, 2017

(54) IMAGE FORMING APPARATUS INCLUDING DRIVING LEVER SWITCHING DRIVEN UNIT INTO TRANSMISSION STATE AND TRANSMISSION RELEASE STATE

(71) Applicant: KYOCERA Document Solutions Inc., Osaka (JP)

(72) Inventors: Kiyonori Yamamoto, Osaki (JP); Masaki Murashima, Osaka (JP); Nobuhiro Fukuma, Osaka (JP); Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/212,604

(22) Filed: Jul. 18, 2016

(65) Prior Publication Data

US 2017/0031299 A1    Feb. 2, 2017

(30) Foreign Application Priority Data

Jul. 30, 2015 (JP) ................................. 2015-150698
Apr. 28, 2016 (JP) ................................. 2016-090619

(51) Int. Cl.
*G03G 15/00* (2006.01)
*F16D 11/14* (2006.01)
*F16D 1/10* (2006.01)
*F16D 23/12* (2006.01)

(52) U.S. Cl.
CPC ............ *G03G 15/757* (2013.01); *F16D 1/10* (2013.01); *F16D 11/14* (2013.01); *F16D 2001/102* (2013.01); *F16D 2023/123* (2013.01)

(58) Field of Classification Search
CPC .................................................. G03G 21/1857
See application file for complete search history.

(56) References Cited

U.S. PATENT DOCUMENTS

| | | | | |
|---|---|---|---|---|
| 2006/0029418 A1* | 2/2006 | Ishii | ................... | G03G 21/1857 399/111 |
| 2007/0147883 A1* | 6/2007 | Sato | ................... | G03G 21/1864 399/111 |
| 2009/0060570 A1* | 3/2009 | Mizuno | ................... | G03G 21/12 399/114 |

FOREIGN PATENT DOCUMENTS

JP         2005-316283 A        11/2005

* cited by examiner

*Primary Examiner* — Victor Verbitsky
(74) *Attorney, Agent, or Firm* — Studebaker & Brackett PC

(57) ABSTRACT

An image forming apparatus includes a driven unit, a coupling mechanism, a driving lever and a locking mechanism. The driven unit is configured to be supported slidably between a storage position and a pull-out position. The driving unit is driven by a driving force from a driving source. The coupling mechanism is configured to be switchable between a transmission state and a transmission release state. The driving lever is slidable between a transmission position and a transmission release position. The locking mechanism is configured to prevent the sliding of the driving lever from the transmission release position toward the transmission position. The sliding of the driving lever from the transmission release position into the transmission state can be permitted by the sliding of the driven unit from the pull-out position into the storage position.

7 Claims, 19 Drawing Sheets

REAR ← → FRONT

LEFT ←⟶ RIGHT

IMAGE FORMING APPARATUS INCLUDING DRIVING LEVER SWITCHING DRIVEN UNIT INTO TRANSMISSION STATE AND TRANSMISSION RELEASE STATE

INCORPORATION BY REFERENCE

This application is based on and claims the benefit of priorities from Japanese Patent application No. 2015-150698 filed on Jul. 30, 2015 and Japanese Patent application No. 2016-090619 filed on Apr. 28, 2016, the entire contents of which are incorporated herein by reference.

BACKGROUND

The present disclosure relates to an image forming apparatus including an image forming unit which is slidably provided.

In an image forming apparatus such as a printer or a multifunction peripheral, there is known a construction in which an image forming unit including a photosensitive drum or a development device or the like is slidably provided relative to an apparatus main body and a driving source to drive the image forming unit is provided at the apparatus main body. Such a construction requires a coupling mechanism to transmit a driving force of the driving source to the image forming unit that is attached to the apparatus main body.

As the coupling mechanism to transmit the driving force, there is known a coaxial driving force transmission manner in which a driving force input shaft of the image forming unit and a driving shaft of the driving source are coaxially coupled to each other via a joint member. In such a coaxial driving force transmission manner, the coupling mechanism is configured to be switchable by a driving lever into a transmission state in which the joint member is advanced in an axial direction so as to be coupled to the image forming unit and a transmission release state in which the joint member is retracted in the axial direction so as to be separated away from the image forming unit.

The driving lever is supported at the apparatus main body so as to be slidable between a transmission position at which the coupling mechanism is switched into the transmission state and a transmission release position at which the coupling mechanism is switched into the transmission release state. In a case where the driving lever is thus slidably supported at the apparatus main body, there may be a case in which the driving lever slides unintentionally while the image forming unit is pulled out from the apparatus main body. If the driving lever slides to switch the coupling mechanism into the transmission state while the image forming unit is pulled out from the apparatus main body, there may be a case in which since the joint member is advanced, the image forming unit cannot be attached to the apparatus main body or the joint member interferes with the image forming unit and is damaged.

SUMMARY

In accordance with an embodiment of the present disclosure, an image forming apparatus includes a driven unit, a coupling mechanism, a driving lever and a locking mechanism. The driven unit is configured to be supported slidably between a storage position to be stored in a casing and a pull-out position to be pulled out outside of the casing. The driving unit is driven by a driving force from a driving source. The coupling mechanism is provided between the driven unit and the driving source. The coupling mechanism is configured to be switchable between a transmission state in which the driven unit and the driving source are coupled to each other to be able to transmit the driving force to the driven unit and a transmission release state in which the driven unit and the driving source are decoupled from each other to release the transmission of the driving force to the driven unit. The driving lever is supported to be slidable between a transmission position at which the coupling mechanism is switched into the transmission state from the transmission release state and a transmission release position at which the coupling mechanism is switched into the transmission release state from the transmission state. The locking mechanism is configured to prevent the sliding of the driving lever from the transmission release position toward the transmission position. The locking mechanism is configured such that the sliding of the driving lever from the transmission release position into the transmission state can be permitted by the sliding of the driven unit from the pull-out position into the storage position.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to figures, an image forming apparatus according to an embodiment of the present disclosure will be described.

Figure 1:
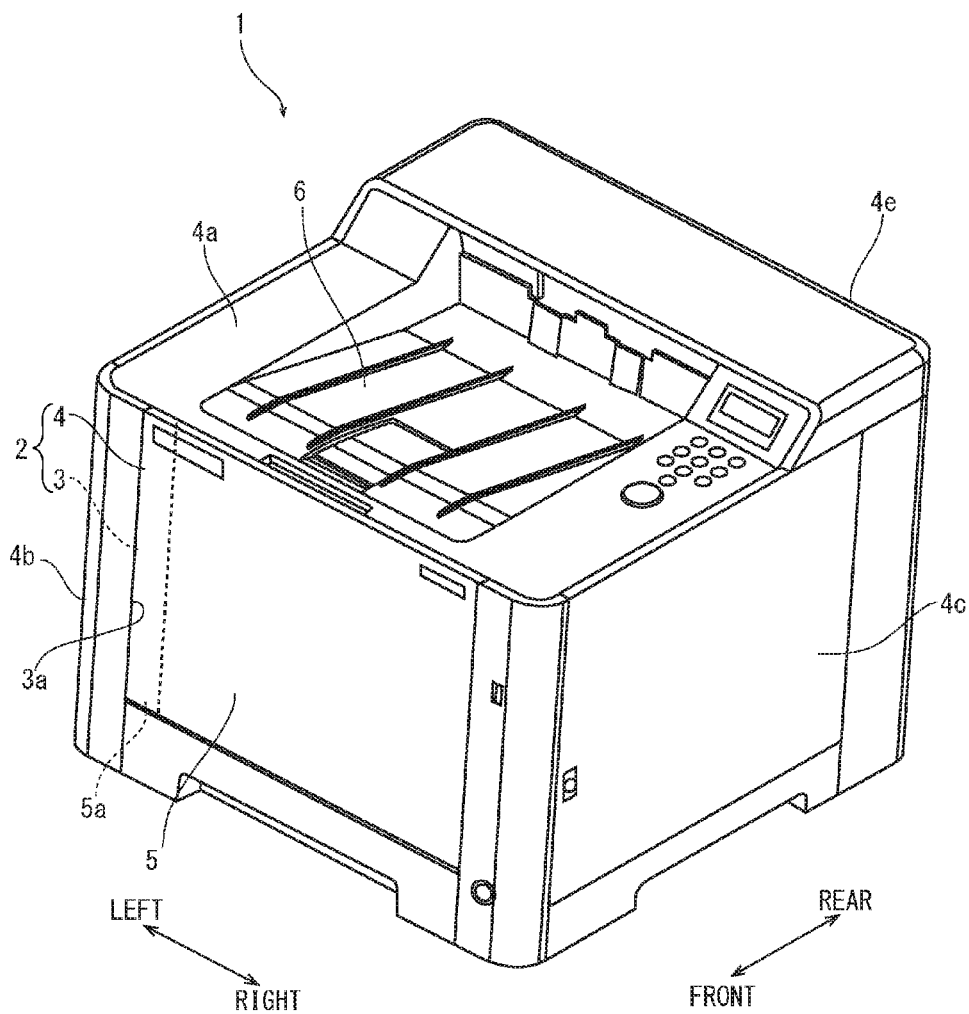
FIG. 1 is a perspective view showing a color printer according to an embodiment of the present disclosure.
Figure 2:
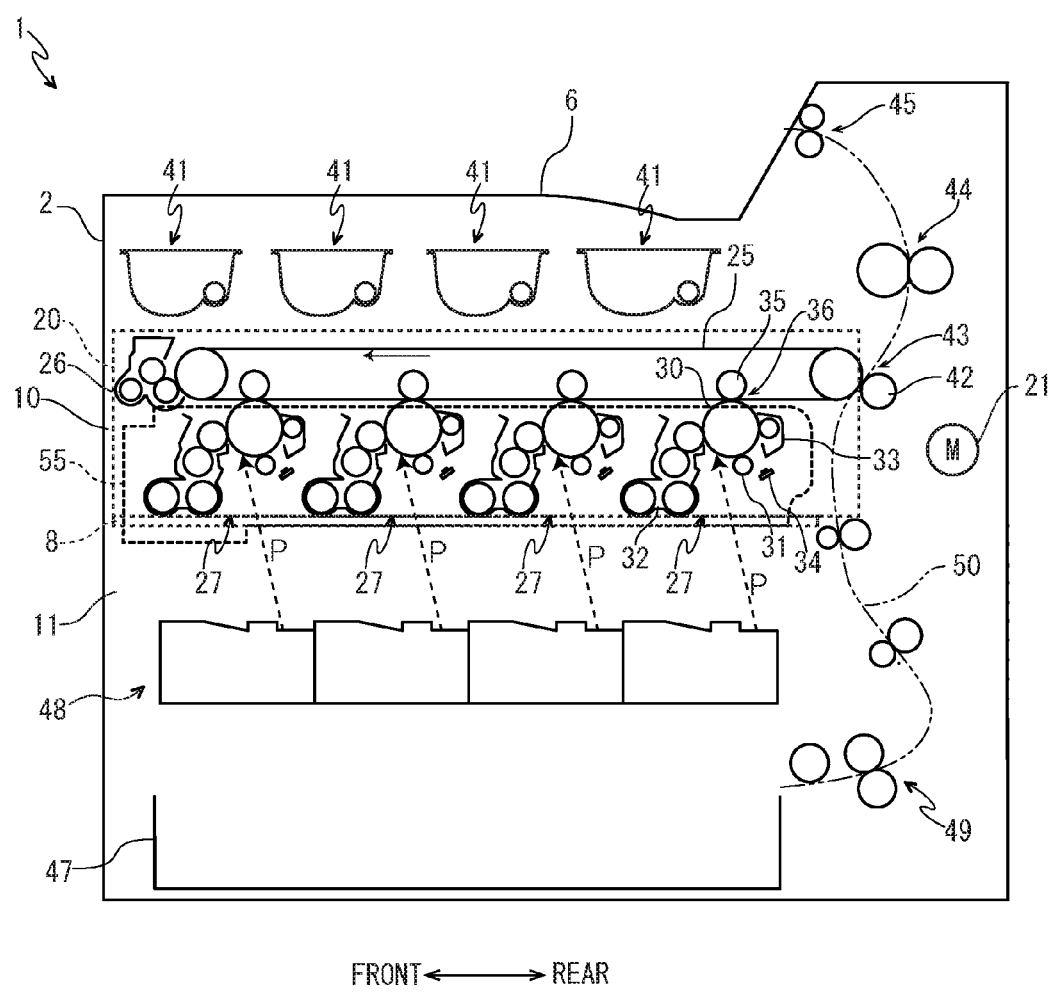
FIG. 2 is a front view schematically showing an internal construction of the color printer according to the embodiment of the present disclosure.
Figure 3:
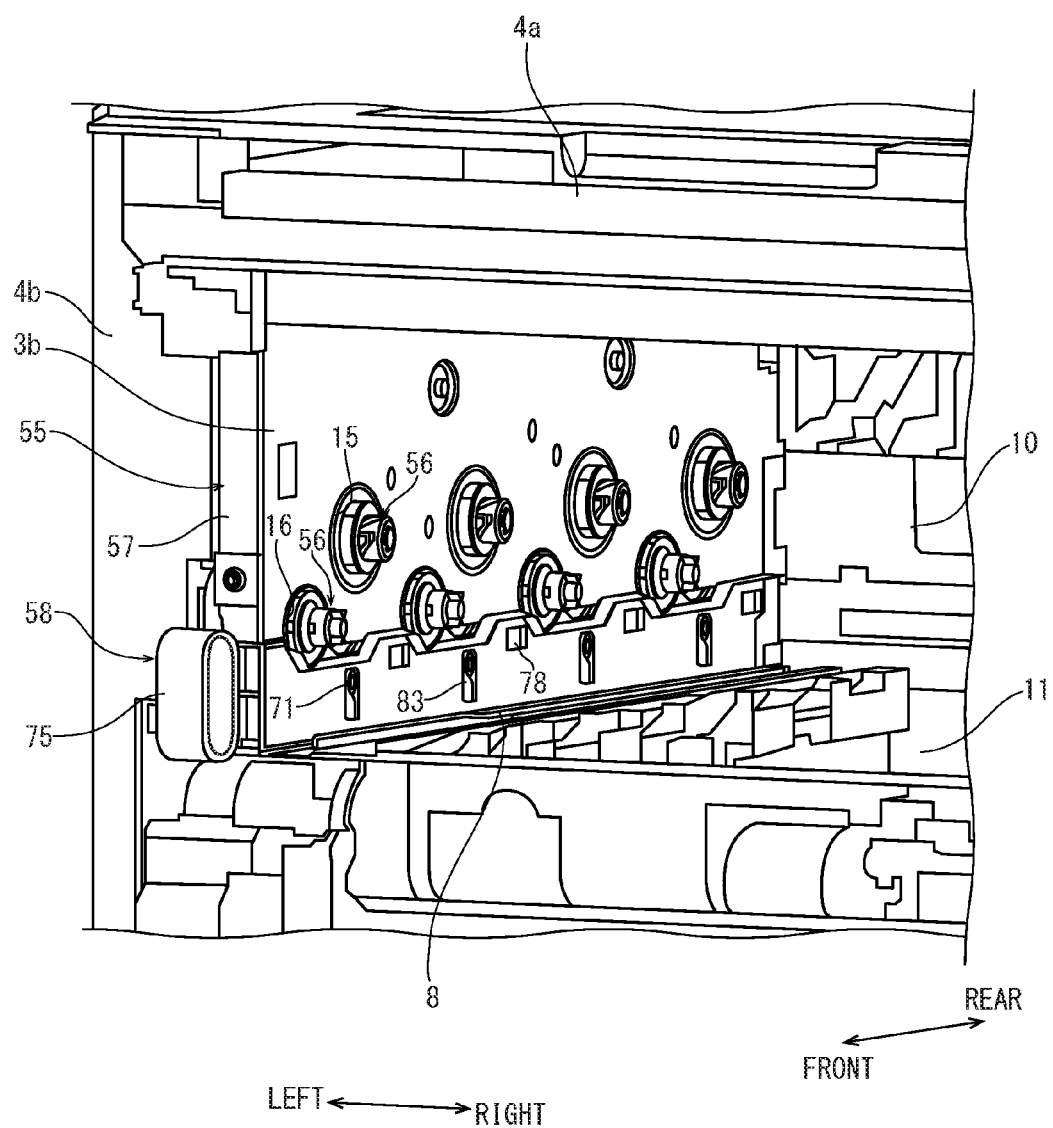
FIG. 3 is a perspective view showing an image forming unit storage space, in the color printer according to the embodiment of the present disclosure.
Figure 4:
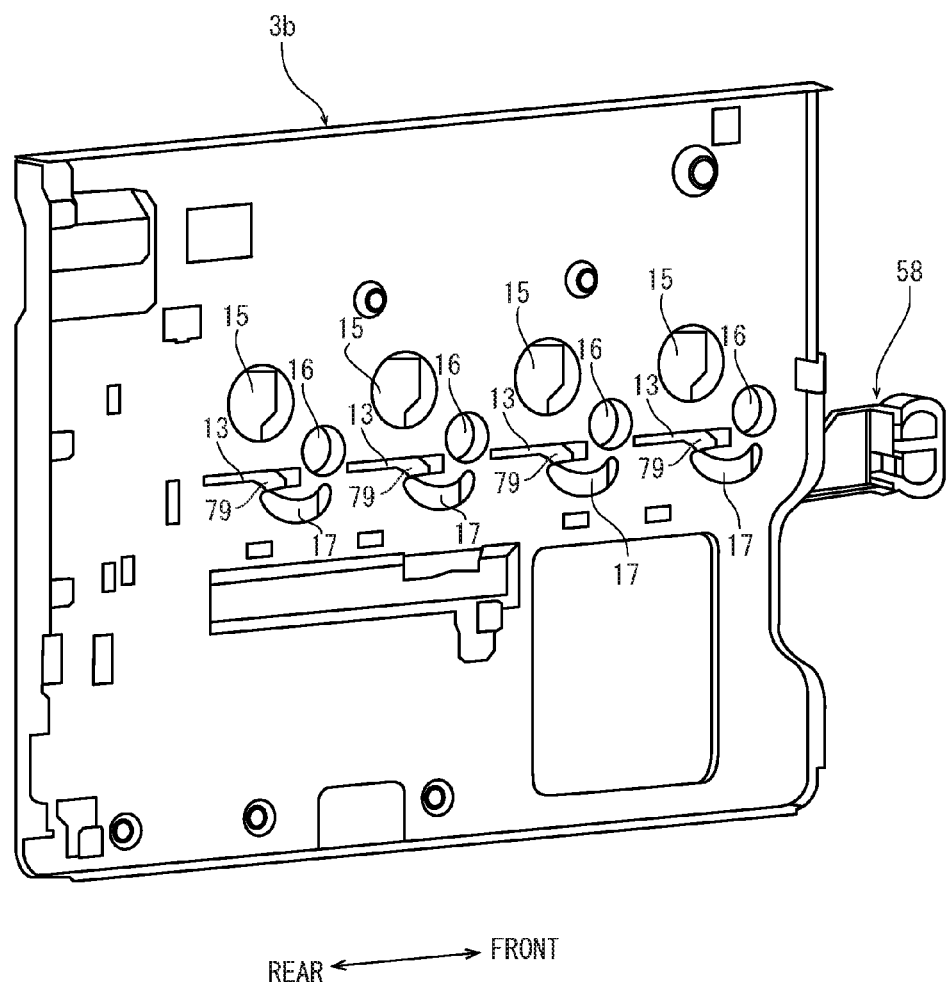
FIG. 4 is a perspective view showing a left side plate of a casing, in the color printer according to the embodiment of the present disclosure.
Figure 5:
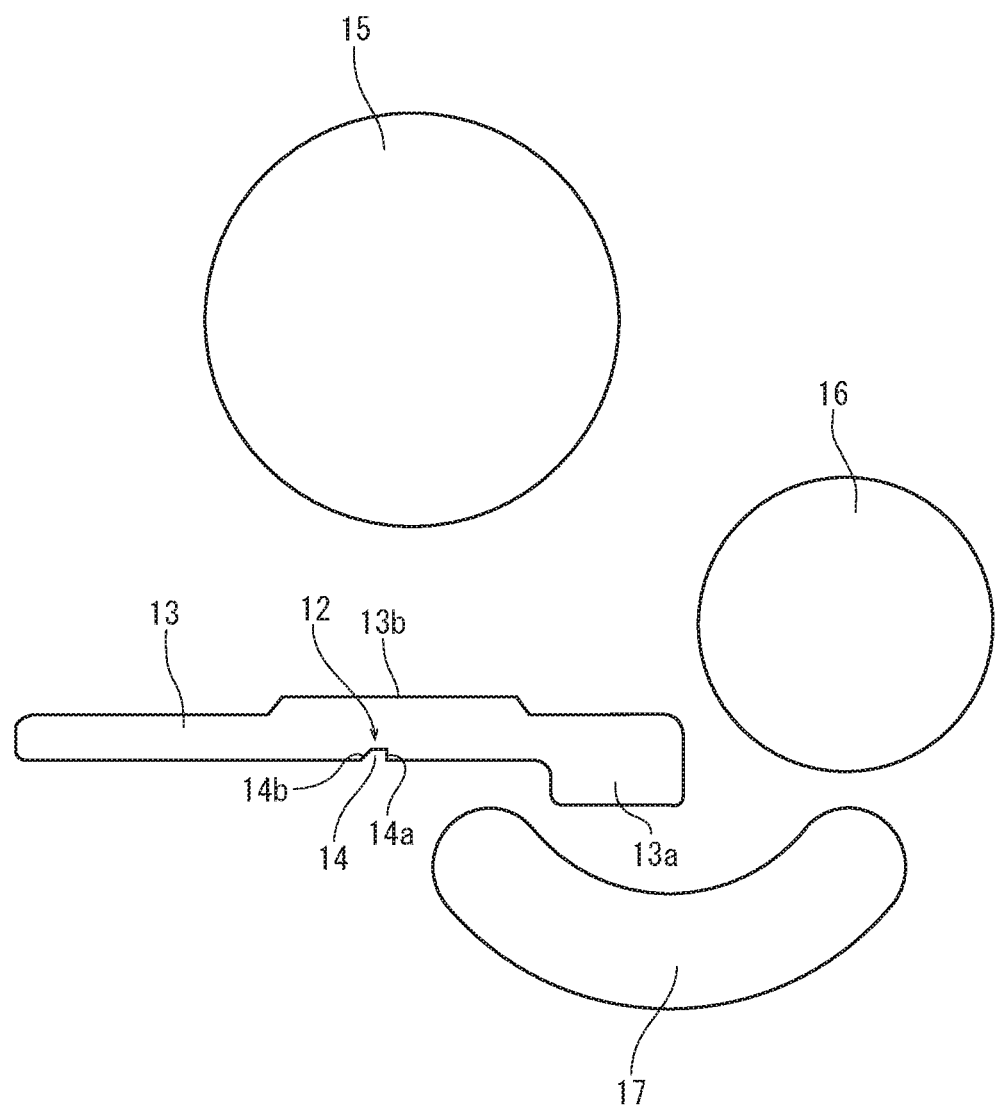
FIG. 5 is a front view showing a locking mechanism provided on the left side plate, in the color printer according to the embodiment of the present disclosure.
Figure 6:
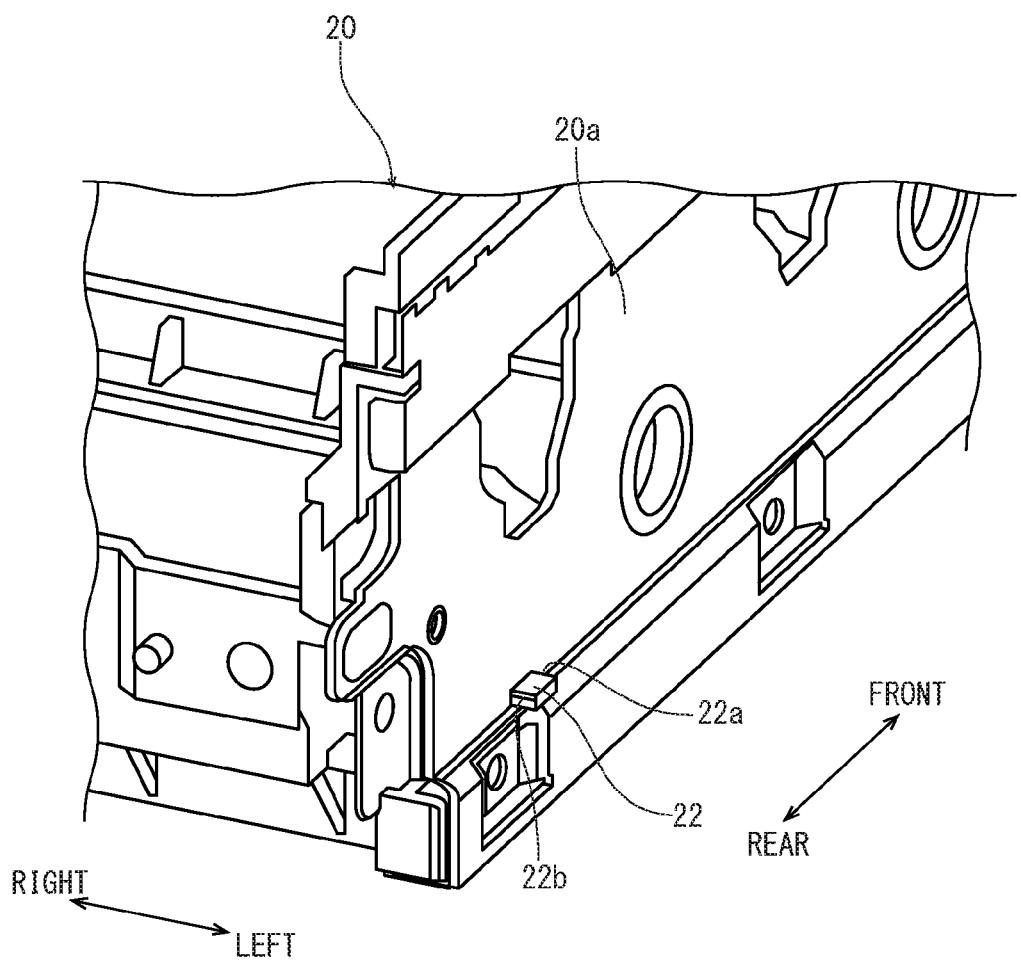
FIG. 6 is a perspective view showing a lower protrusion piece provided at the image forming unit, in the color printer according to the embodiment of the present disclosure.

First, with reference to FIGS. 1 to 6, an entire structure of a color printer 1 as an image forming apparatus will be described. FIG. 1 is a perspective view showing the color printer, FIG. 2 is a front view schematically showing an internal construction of the color printer, FIG. 3 is a perspective view showing an image forming unit storage space, FIG. 4 is a perspective view showing a left side plate of a casing, FIG. 5 is a front view showing a locking mechanism provided on the left side plate and FIG. 6 is a perspective view showing a lower protrusion piece provided at the image forming unit. In the following description, front and rear directions and left and right directions indicate front and rear directions and left and right directions shown in FIG. 1.

The color printer 1 has a rectangular parallelepiped shaped apparatus main body 2 as shown in FIG. 1. The apparatus main body 2 includes a box shaped housing 3 and exterior covers 4 which cover outside faces of the housing 3. The housing 3 is formed by a bottom plate, an upper plate, a left side plate, a right side plate and a rear plate. The left side plate and the right side plate face each other in the left and right directions. On a front face of the housing 3, an opening 3a is formed. The exterior covers 4 include an upper cover 4a which covers the outside face of the upper plate, a left side cover 4b which covers the outside face of the left side plate, a right side cover 4c which covers the outside face of the right side plate and a front cover 5 which opens and closes the opening 3a. The front cover 5 is configured to be turned around its lower end. On an inside face of the front cover 5, a flat abutment face 5a is formed along the left edge. On a center portion of the upper cover 4a, an ejected sheet tray 6 on which a sheet is ejected is formed.

As shown in FIG. 2 and FIG. 3, on inside faces of the left side plate 3b and the right side plate of the housing 3, a pair of left and right rail 8 extending in the front and rear directions are formed at near a center in the vertical direction. Inside of the housing 3 is divided into an image forming unit storage space 10 above the pair of left and right rail 8 and a cassette storage space 11 under the pair of left and right rail 8.

Referred to FIG. 4 and FIG. 5, the left side plate 3b of the housing 3 will be described. The left side plate 3b is provided with four slide grooves 13 extending straightly in the front and rear directions. The four slide grooves 13 are formed along the front and rear directions above the pair of left and right rail 8. As shown in FIG. 5, the slide groove 13 is formed with a lower depression 13a at the front end. The rearmost slide groove 13 is formed with a protrusion 14 protruding upward from near a center portion of the lower edge. The protrusion 14 acts as a locking mechanism 12 configured to prevent a sliding of the driving lever 58 described below from a transmission release position to a transmission position. The protrusion 14 has a front end face 14a standing perpendicular to the lower edge and a rear end face 14b standing at an obtuse angle relative to the lower edge. The rear end face 14b inclines in an oblique upper direction from the rear side to the front side. Above the protrusion 14, the slide groove 13 is formed with a shallow upper depression 13b along the upper edge.

In addition, the left side plate 3b is formed with a circular large diameter aperture 15 above each slide groove 13 and a circular small diameter aperture 16 on an oblique front upper side of each slide groove 13. Under the lower depression 13a of each slide groove 13, a guide groove 17 having an arc shape protruding downward is formed.

As shown in FIG. 2, the image forming unit storage space 10 stores an image forming unit 20 as a driven unit and a motor 21 as a driving source which applies a driving force to the image forming unit 20. The image forming unit 20 has a box-shaped housing formed by a bottom plate, a front plate, left and right side supporting plates 20a. The left and right side supporting plates 20a face each other in the left and right directions. The left and right supporting plates 20 each are formed with a lower protrusion piece 22 protruding outward from the rear portion of the outside face. The lower protrusion piece 22 is formed into a thin horizontal plate long in the front and rear directions. A corner between an upper face and a front end face and a corner between the upper face and a rear end face are formed into a front tapered face 22a and a rear tapered 22b, respectively.

As shown in FIG. 2, the image forming unit 20 is provided with an intermediate transferring belt 25 rotatably supported, a belt cleaning device 26 arranged at a front end of the intermediate transferring belt 25 and four image forming parts 27 arranged under the intermediate transferring belt 25 along the front and rear directions.

At each image forming part 27, a photosensitive drum 30 is rotatably provided around a rotating shaft. Around the photosensitive drum 30, a charger 31, a development device 32, a cleaning device 33 and a static eliminator 34 are disposed in sequential order along a rotation direction of the photosensitive drum 30. Between the development device 32 and the cleaning device 33, a first transfer roller 35 is disposed via the intermediate transferring belt 25. Between the intermediate transferring belt 25 and the photosensitive drum 30, a first transferring part 36 is formed. The development device 32 has an agitating roller, a conveying roller, a magnet roller and a developing roller. These rollers are connected to a driving force input shaft (not shown) via a gear train. At a tip end of each of the rotating shaft of the photosensitive drum 30 and the driving force input shaft of the development device 32, a driven side joint (not shown) are respectively provided. The driven side joints each are exposed from an aperture formed in the left supporting plate 20a.

The image forming unit 20 is supported slidably along the pair of left and right rail 8 in the front and rear directions between a most rearward storage position and a most forward pull-out position. At the storage position, the image forming unit 20 is stored in the image forming unit storage space 10 and the driven side joints provided at the rotating shaft of the photosensitive drum 30 and the driving force input shaft of the development device 32 face the large diameter aperture 15 and the small diameter aperture 16 respectively. At the pull-out position, most of entire part of the image forming unit 20 is pulled out forward from the image forming unit storage space 10 through the opening 3a.

In the image forming unit storage space 10, four toner containers 41 containing each toner of four colors (Y, M, C and K) are stored detachably. The four toner containers 41 are connected to the corresponding image forming part 27. In a rear space of the image forming unit storage space 10, a second transferring roller 42 is disposed via the intermediate transferring belt 25. Between the second transferring roller 42 and the intermediate transferring belt 25, a second transferring part 43 is formed. Above the second transferring part 43, a fixing device 44 is disposed and, above the fixing device 44, a sheet ejecting part 45 is provided.

The cassette storage space 11 stores a sheet feeding cassette 47 and an exposure device 48 containing a laser scanning unit (LSU). The sheet feeding cassette 47 is slidably supported in the front and rear directions in a lower space. The exposure device 48 is disposed in an upper space. In a rear space, a sheet feeding device 49 configured to feed a sheet stored in the sheet feeding cassette 47 is disposed. In the housing 3, a sheet conveying path 50 is formed from the sheet feeding device 49 to the sheet ejecting part 45 through the second transferring part 43 and the fixing device 44.

Next, the operation of forming an image by the color printer 1 having such a configuration will be described. At each image forming parts 27, after a surface of the photosensitive drum 30 is charged by the charger 31, the exposure device 48 exposes the surface of the photosensitive drum 30 with a laser light (refer to an arrow p in FIG. 1) to form an electrostatic latent image on the surface of the photosensitive drum 30. The electrostatic latent image is then developed into a toner image of corresponding color by the developing device 32. The toner image is first-transferred on the intermediate transferring belt 25 at the first transferring part 36. The above operation is carried out at each image forming part 27 to form a full color toner image on the intermediate transferring belt 25. The toner and charge remained on the photosensitive drum 30 are removed by the cleaning device 33 and the static eliminator 34, respectively.

On the other hand, the sheet fed from the sheet feeding cassette 47 by the sheet feeding device 49 is conveyed along the sheet conveying path 50 into the second transferring part 43 in a suitable timing with the above image forming operation. At the second transferring part 43, the full color toner image on the intermediate transferring belt 25 is second-transferred on the sheet. The sheet on which the full color toner image has been transferred is conveyed on a downstream side along the sheet conveying path 50 and enters the fixing device 44 and then, the toner image is fixed on the sheet in the fixing device 44. The sheet with the fixed toner image is ejected from the sheet ejecting part 45 onto the ejected sheet tray 6.

Figure 7:
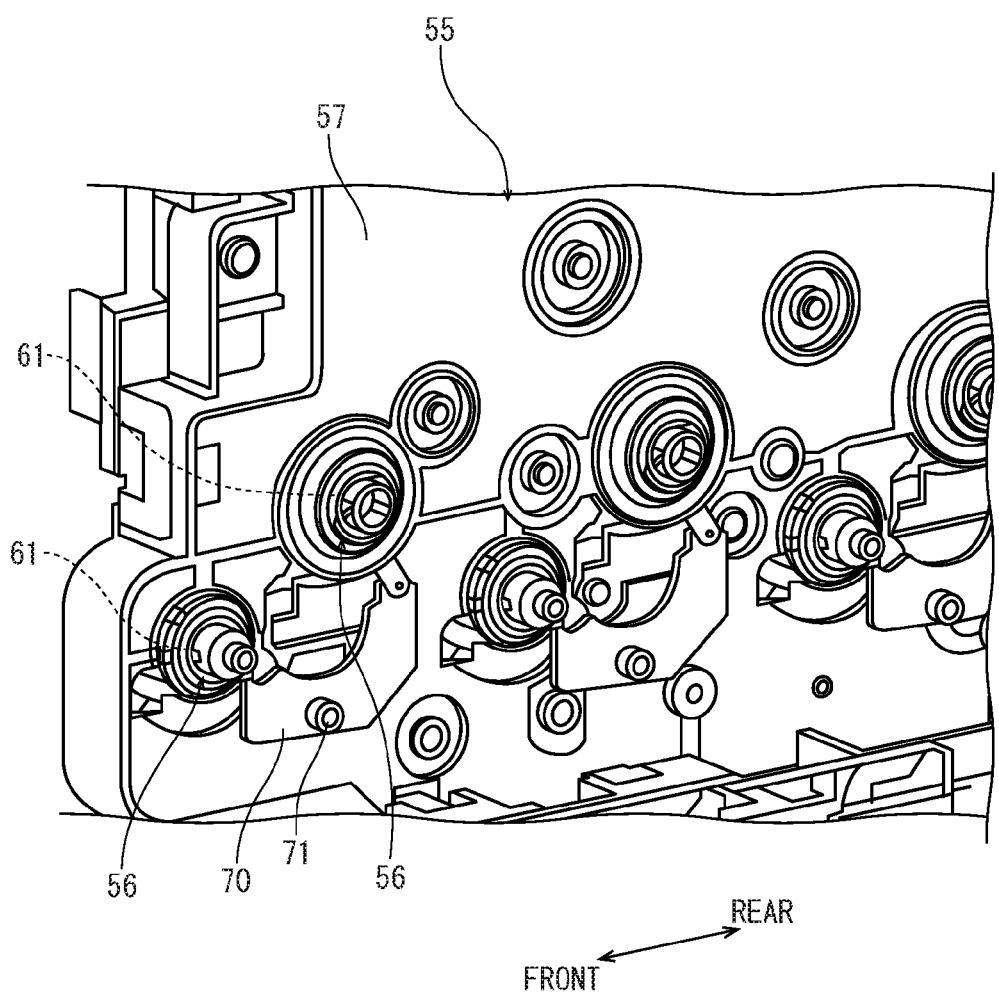
FIG. 7 is a perspective view showing a driving force transmission mechanism, in the color printer according to the embodiment of the present disclosure.

Next, with reference to FIG. 3 and FIG. 7 mainly, a driving force transmission mechanism 55 configured to transmit a driving force from the motor 21 to each image forming part 27 of the image forming unit 20 will be described. FIG. 7 is a perspective view of the driving force transmission mechanism.

The driving force transmission mechanism 55, as shown in FIG. 3, includes a base member 57, a coupling mechanism 56 and a driving lever 58. The base member 57 is disposed between the left side plate 3b of the casing 3 and the left side face cover 4b. The coupling mechanisms 56 is supported by the base member 57 and configured to be able to be coupled to each driven side joint of the photosensitive drum 30 and the development device 32 of each image forming part 27. The driving lever 58 is slidably supported in the front and rear directions with respect to the base member 57. The coupling mechanism 56 of the photosensitive drum 30 and the coupling mechanism 56 of the development device 32 both have the same construction.

The base member 57 is a plate-shaped member formed into a transversely elongated shape. As shown in FIG. 7, on the inside face of the base member 57, a supporting shaft 61 is protruded rightward so as to correspond to a center of each of the large diameter apertures 15 and the small diameter apertures 16, both of which are formed in the left side plate 3b of the casing 3. At each supporting shaft 61, the coupling mechanism 56 is supported.

Figure 8:
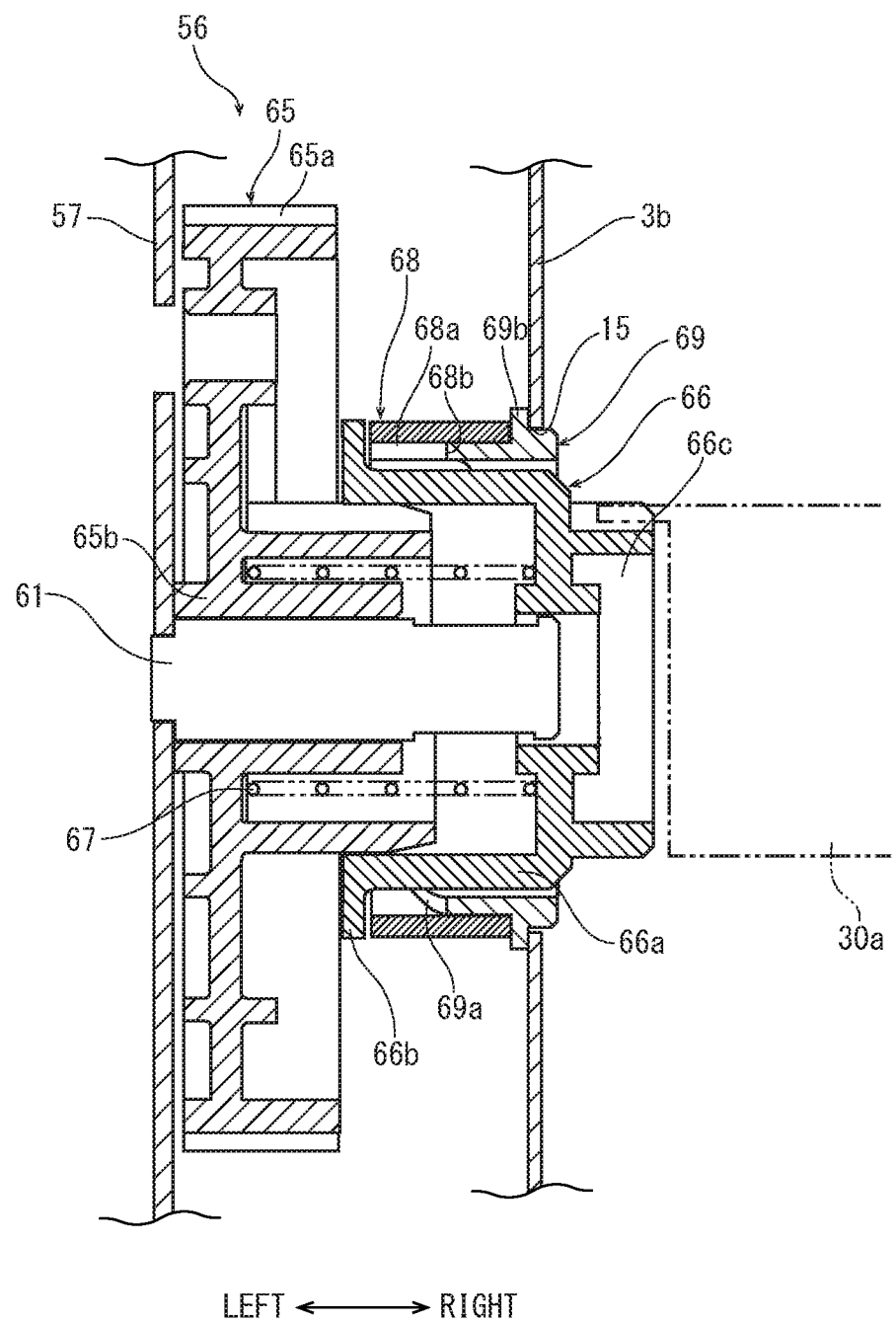
FIG. 8 is a sectional side view showing a coupling mechanism in a transmission state, in the color printer according to the embodiment of the present disclosure.
Figure 9:
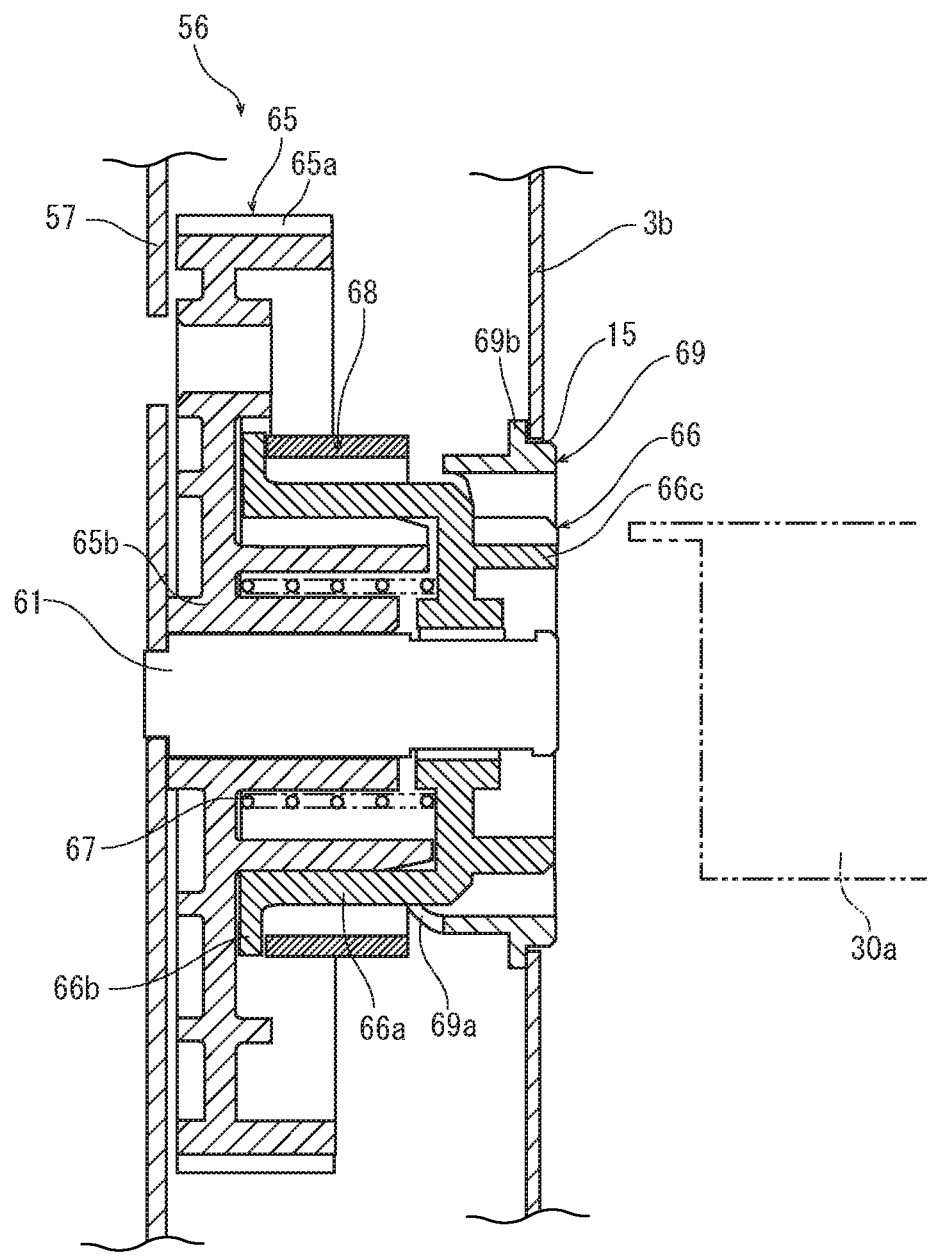
FIG. 9 is a sectional side view showing the coupling mechanism in a transmission release state, in the color printer according to the embodiment of the present disclosure.
Figure 10:
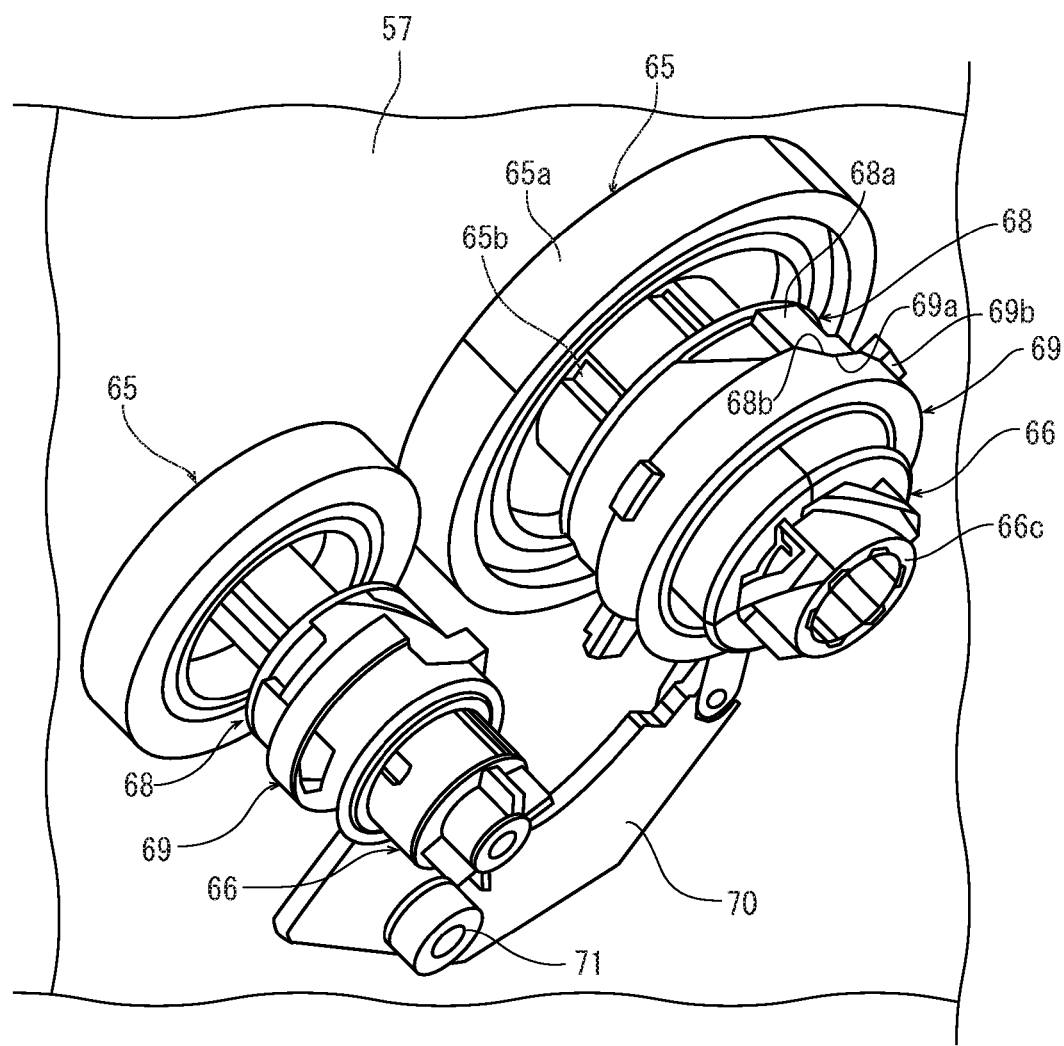
FIG. 10 is a perspective view showing the coupling mechanism in the transmission state, in the color printer according to the embodiment of the present disclosure.
Figure 11:
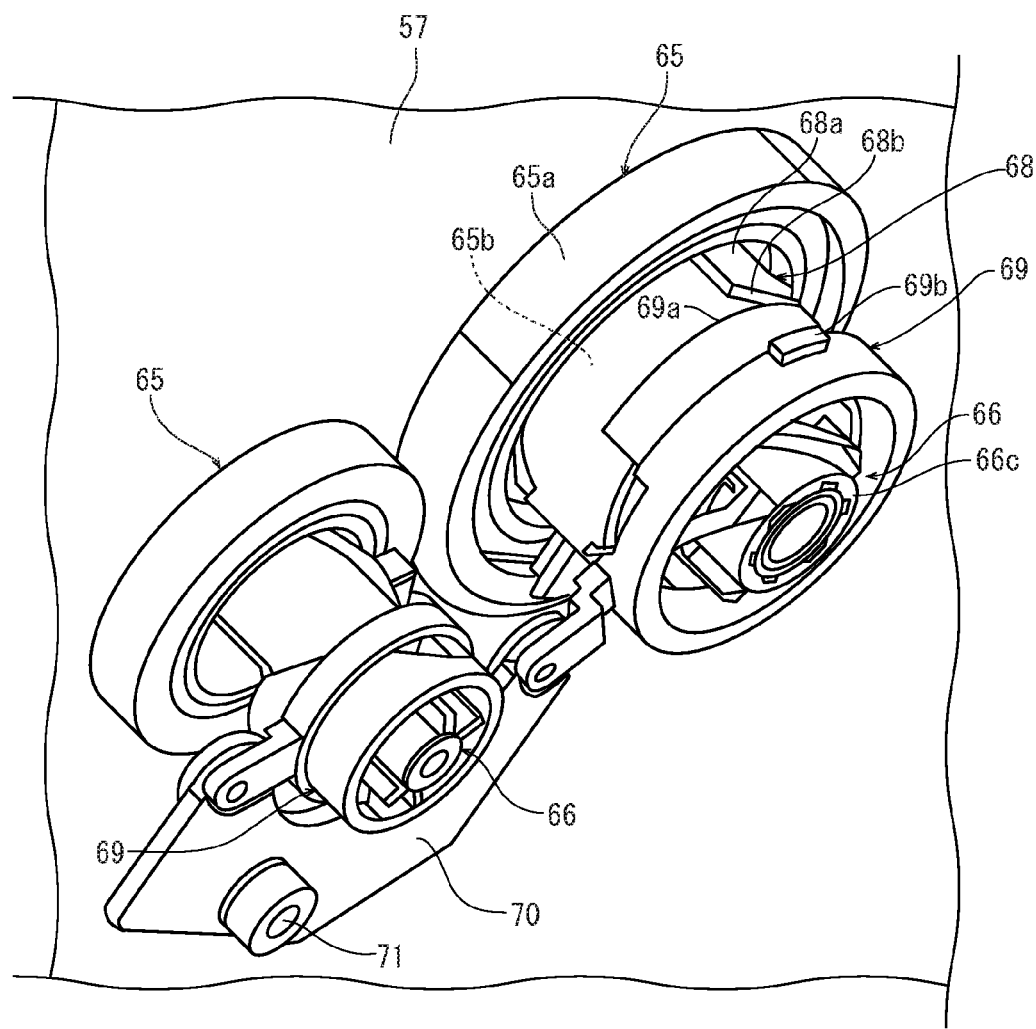
FIG. 11 is a perspective view showing the coupling mechanism in the transmission release state, in the color printer according to the embodiment of the present disclosure.
Figure 12:
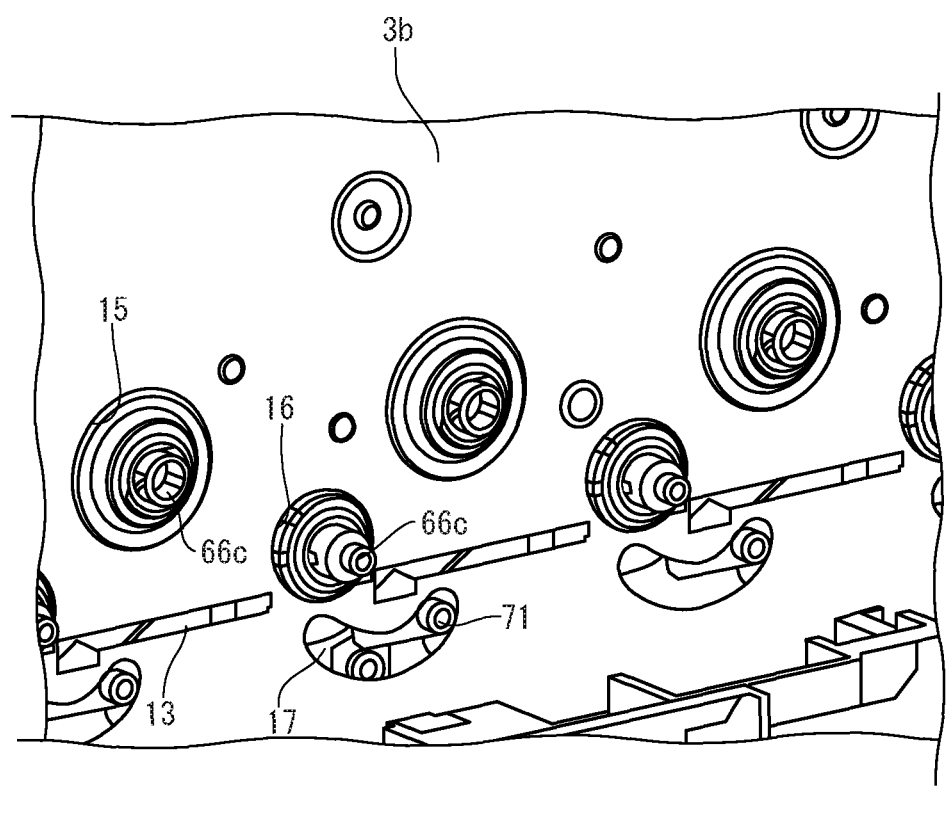
FIG. 12 is a perspective view showing the coupling mechanism supported on the left side plate, in the color printer according to the embodiment of the present disclosure.

Next, the coupling mechanism 56 will be described with reference to FIG. 8 to FIG. 12. FIG. 8 is a sectional side view showing the coupling mechanism in a transmission state; FIG. 9 is a sectional side view showing the coupling mechanism in the transmission release state; FIG. 10 is a perspective view of the coupling mechanism in the transmission state; FIG. 11 is a perspective view of the coupling mechanism in the transmission release state; and FIG. 12 is a perspective view showing the driving force transmission mechanism supported by the left side plate. Here, the coupling mechanism 56 to be coupled to the driven side joint 30a provided at the rotating shaft of the photosensitive drum 30 will be described.

As shown in FIG. 8 and FIG. 9, the coupling mechanism 56 has a driving gear 65, a driving side joint 66, a coil spring 67, a cam member 68 and a bushing 69. The driving gear 65 is configured to be rotated by the motor 21. The driving side joint 66 is capable of coupling to the driven side joint 30a. The coil spring 67 biases the driving side joint 66 toward the driven side joint 30a. The cam member 68 presses the driving side joint 66 apart from the driven side joint 30a. The bushing 69 is configured to be abutted with the cam member 68.

The driving gear 65 has a disk-shaped gear part 65a and a shaft part 65b provided coaxially with the gear part 65a. The shaft part 65b is rotatably supported to the supporting shaft 61 provided on the base member 57.

The driving side joint 66 has a cylindrical shaft part 66a, a circular ring-shaped flange part 66b and a substantially cylindrical engagement part 66c. The flange part 66b overhangs outward from a proximal side end edge (left end edge) of the shaft part 66a. The engagement part 66c is provided at a tip side end edge (right end edge) of the shaft part 66a and is capable of engaging with the driven side joint 30a. The shaft part 66a is fitted onto the shaft part 65b of the driving gear 65 so as to be rotatable together with the shaft part 65b and to be slidable in the axial direction of the shaft part 65b. Namely, the driving side joint 66 is rotated around the supporting shaft 61 by rotation of the driving gear 65.

The coil spring 67 is fitted onto the shaft part 65b of the driving gear 65 so as to bias the driving side joint 66 in a direction (rightward) in which the driving side joint 66 is spaced away from the gear part 65a with respect to the driving gear 65.

The cam member 68 is a cylindrical member and is formed with protrusions 68a protruding from diagonal positions of the inner circumference face along the circumferential direction. On a tip side (right side) end face of each protrusion 68a, a cam face 68b inclining along the circumferential direction is formed. The cam member 68 is fitted onto the shaft part 66a of the driving side joint 66 and a proximal side (left side) end face abuts against the flange part 66b of the driving side joint 66.

The bushing 69 is a cylindrical member and is formed with engagement faces 69a provided on diagonal positions of a proximal side (left side) end face. The engagement face 69a inclines along the circumferential direction. With the engagement faces 69a, the cam faces 68b of the cam member 68 are engaged. In addition, on the outer circumferential face of the bushing 69, a plurality of engagingly locking pieces 69b protruding outward in a radial direction are formed. The bushing 69 is fitted between the shaft part 66a of the driving side joint 66 and the cam member 68, and the engagement faces 69a engage with the cam faces 68b of the cam member 68.

As shown in FIG. 10 and FIG. 11, in one image forming part 27, the bushing 69 of the coupling mechanism 56 to be coupled to the photosensitive drum 30 and the bushing 69 of the coupling mechanism 56 to be coupled to the development device 32 are coupled to each other by a link member 70. If the link member 70 moves in one direction, both of the bushings 69 rotate in one direction, and if the link member 70 moves in another direction, both of the bushings 69 rotate in the opposite direction. On the inside face of each link member 70, a boss 71 is protruded.

As shown in FIG. 12, if the driving force transmission mechanism 55 is supported on the left side plate 3b, the coupling mechanism 56 to be coupled to the photosensitive drum 30 opposes to the large diameter aperture 15 of the left side plate 3b, and the engagingly locking pieces 69b of the bushing 69 are engaged with an inner edge of the large diameter aperture 15. In addition, the coupling mechanism 56 to be coupled to the development device 32 opposes to the small diameter aperture 16 of the left side plate 3b, and the engagingly locking pieces 69b of the bushing 69 are engagingly locked with an inner edge of the small diameter aperture 16. As described previously, since the bushing 69 is biased in a tip side direction (rightward direction) by the coil spring 67 via the cam member 68 and the driving side joint 66, if the engagingly locking pieces 69b of the bushing 69 are engagingly locked, the cam member 68 retracts with respect to the bushing 69 and then the flange part 66b of the driving side joint 66 is pressed in the proximal side direction (leftward direction) by the cam member 68.

In addition, the boss 71 of each link member 70 protrudes inward through the arc-shaped guide groove 17. Further, the gear part 65a of the driving gear 65 engages with a driving shaft of the motor 21 via a decelerator or the gear train (not shown).

In the driving force transmission mechanism 55 supported by the left side plate 3b, if the link member 70 is moved in one direction, the bushing 69 turns in one direction to move the cam member 68 in an axial direction of the shaft part 65b of the driving gear 65 in accordance with an abutment position between the engagement face 69a and the cam face 68b. Owing to the movement of the cam member 68, the driving side joint 66 moves in the axial direction. If the cam face 68b of the cam member 68 abuts against the deepest portion of the engagement face 69a of the bushing 69, the cam member 68 advances most (moves rightward), and as shown in FIG. 8 and FIG. 10, the engagement part 66c of the driving side joint 66 protrudes inward through the large diameter aperture 15 of the left side plate 3b and then couples with the driven side joint. In this manner, the driving force of the motor 21 is transmitted to the rotating shaft of the photosensitive drum 30 and the driving force input shaft of the development device 32 via the coupling mechanisms 56. That is, the coupling mechanism 56 is switched from the transmission release state into the transmission state.

On the other hand, if the cam face 68b of the cam member 68 moves in a shallower direction of the engagement face 69a, the cam member 68 retracts (moves in the leftward direction). If the cam face 68b abuts against the shallowest portion of the engagement face 69a, the driving side joint 66 retracts until the engagement part 66c is substantially on the same level as the surface of the left side plate 3b, and as shown in FIG. 9 and FIG. 11, the engagement part 66c of the driving side joint 66 is separated away from the driven side joint. In this manner, the transmission of the driving force of the motor 21 to the rotating shaft of the photosensitive drum 30 and the driving input shaft of the development device 32 via the coupling mechanisms 56 is released. That is, the coupling mechanism 56 is switched from the transmission state into the transmission release state. Thus, by tuning of the link member 70 in one direction and in another direction, the coupling mechanism 56 can be switched between the transmission state and the transmission release state. During the tuning of the link member 70, the boss 71 moves in the guide groove 17.

Figure 13:
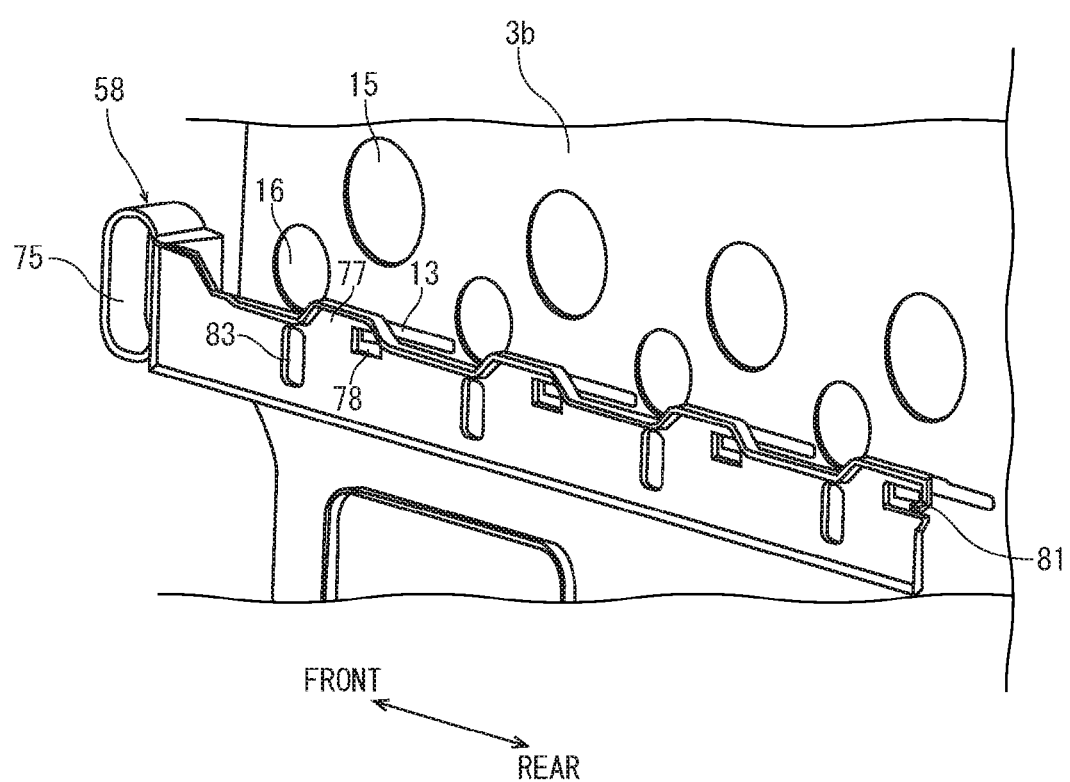
FIG. 13 is a perspective view showing a driving lever, in the color printer according to the embodiment of the present disclosure.
Figure 14:
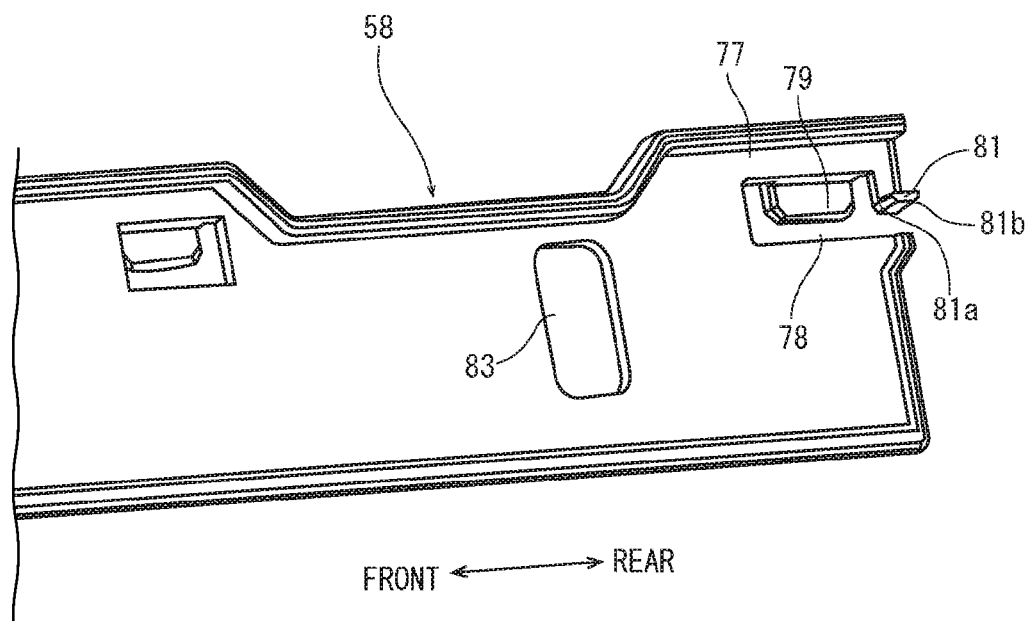
FIG. 14 is a perspective view showing a locking mechanism and an upper protrusion piece which are provided at the driving lever, in the color printer according to the embodiment of the present disclosure.
Figure 15:
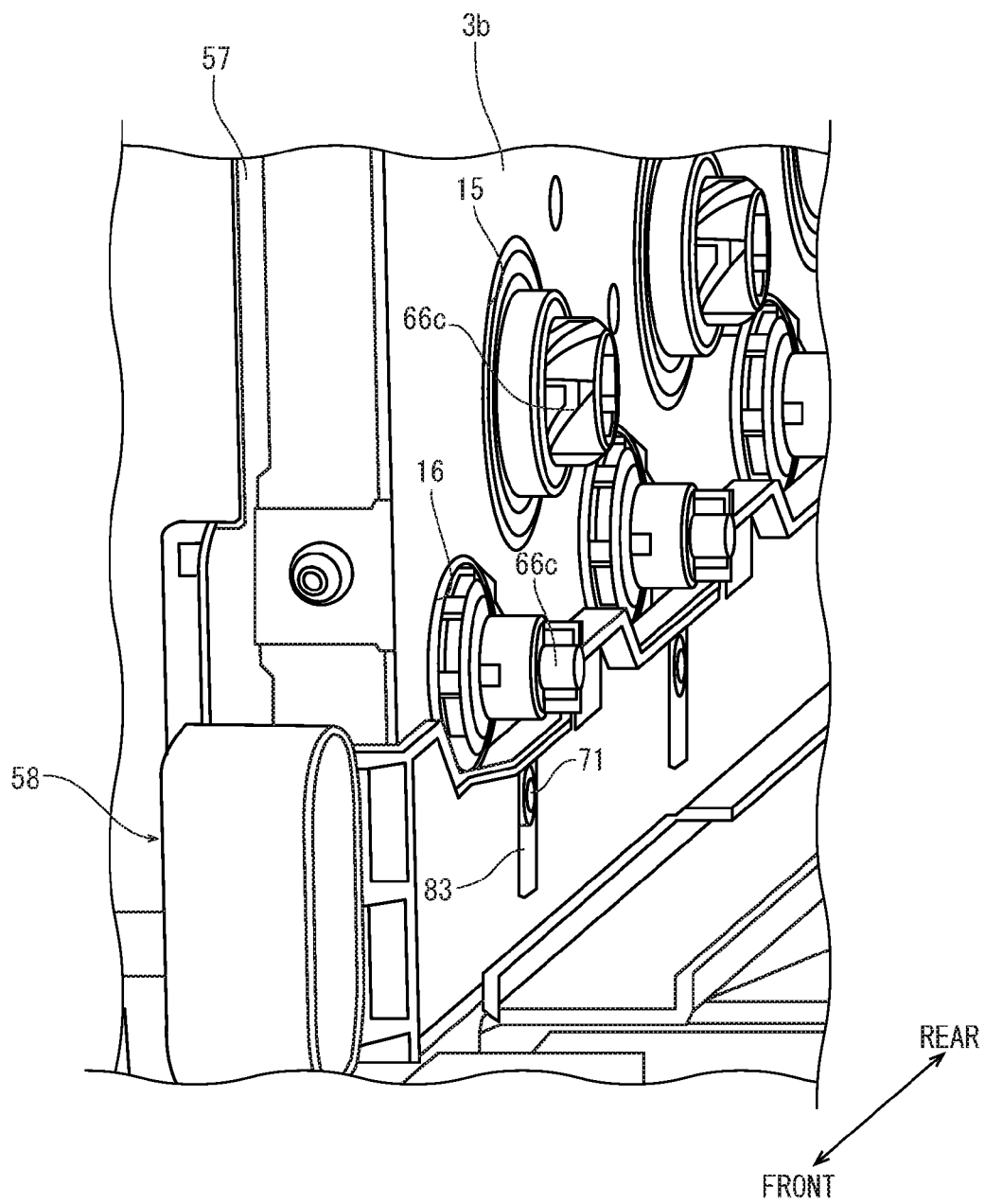
FIG. 15 is a perspective view showing the driving lever slid into a transmission position, in the color printer according to the embodiment of the present disclosure.
Figure 16:
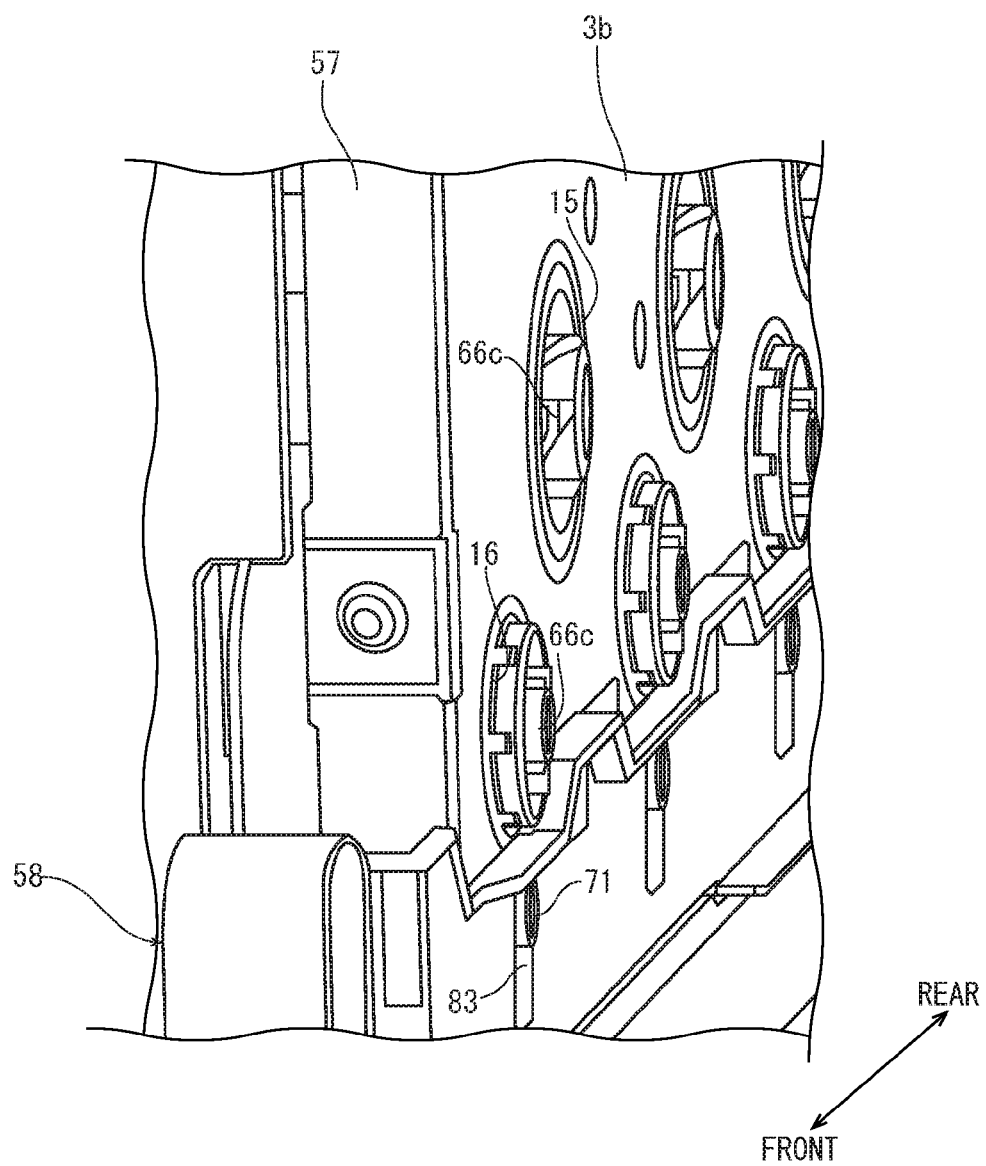
FIG. 16 is a perspective view showing the driving lever slid into a transmission release position, in the color printer according to the embodiment of the present disclosure.

Next, with reference to FIG. 13 to FIG. 16, the driving lever 58 will be described. FIG. 13 is a perspective view showing the driving lever; FIG. 14 is a perspective view showing the locking mechanism and the upper protrusion piece which are provided at the driving lever; FIG. 15 is a perspective view showing the driving lever at the transmission position; and FIG. 16 is a perspective view showing the driving lever at the transmission release position.

The driving lever 58, as shown in FIG. 13, is a long plate-shaped member in the front and rear directions. At a front end of the driving lever 58, a grip 75 is formed. The grip 75 is formed into a cylindrical shape of a vertically long elliptical side view. The driving lever 58 is formed with four protrusions 77 at predetermined intervals along its upper edge. At a portion close to the rear end of each protrusion 77, an aperture 78 of a transversely long rectangular shape is formed. As shown in FIG. 14, along an upper edge of the aperture 78, a downward bending hook part 79 protruding outward is formed. The hook part 79 constitutes the locking mechanism 12 configured to prevent the sliding of the driving lever 58 from the transmission release position to the transmission position together with the protrusion 14 provided in the slide groove 13 formed in the left side plate 3b of the casing 3. Also, between a rear edge of the rearmost aperture 78 and a rear edge of the driving lever 58, an upper protrusion piece 81 protruding inward is formed. The upper protrusion piece 81 is a horizontal plate-shaped thin piece elongated in the front and rear directions. At a corner between a lower face and a front end face and at a corner between the lower face and a rear end face, a front tapered face 81a and a rear tapered face 81b are respectively formed. Further, at the front side from each protrusion 77, a long rectangular hole 83 in the vertical direction is formed.

The driving lever 58, as shown in FIG. 13, is supported to be slidable in the front and rear directions along the slide grooves 13 by engaging each hook part 79 with the lower edge of the corresponding slide groove 13 inside of the left side plate 3b of the casing 3. Incidentally, the hook part 79 is engaged with the slide groove 13 through the lower depression 13a (refer to FIG. 5). In addition, as shown in FIG. 15 and FIG. 16, with the long rectangular hole 83, the boss 71 of the link member 70 is engaged through the guide groove 17 of the left side plate 3b. If the driving lever 58 is slid in the front and rear directions along the slide grooves 13, the boss 71 of the link member 70 moves inside of the guide groove 17 in the front and rear directions while moving inside of the long rectangular hole 83 in the vertical direction. In this manner, the link member 70 moves to rotate the bushing 69.

In detail, when the driving lever 58 is pushed with the grip 75, as shown in FIG. 15, the driving side joint 66 of the coupling mechanism 56 is advanced and then the coupling mechanism 56 is switched from the transmission release state into the transmission state. On the other hand, when the driving lever 58 is pulled out, as shown in FIG. 16, the driving side joint 66 of the coupling mechanism 56 is retracted and then the coupling mechanism 56 is switched from the transmission state to the transmission release state. Thus, the driving lever 58 slides along the slide grooves 13 between the transmission release position at which the coupling mechanism 56 is switched into the transmission release state from the transmission state and the transmission position at which the coupling mechanism 56 is switched into the transmission state from the transmission release state. In addition, in a state in which the driving lever 58 engages in the slide grooves 13 and the image forming unit 20 is housed in the image forming unit storing space 10, the upper protrusion piece 81 provided at the driving lever 58 partially overlaps the lower protrusion piece 22 formed at the left supporting plate 20a of the image forming unit 20 in the vertical direction while the upper protrusion piece 81 displacing upward from the lower protrusion piece 22.

Figure 17A:
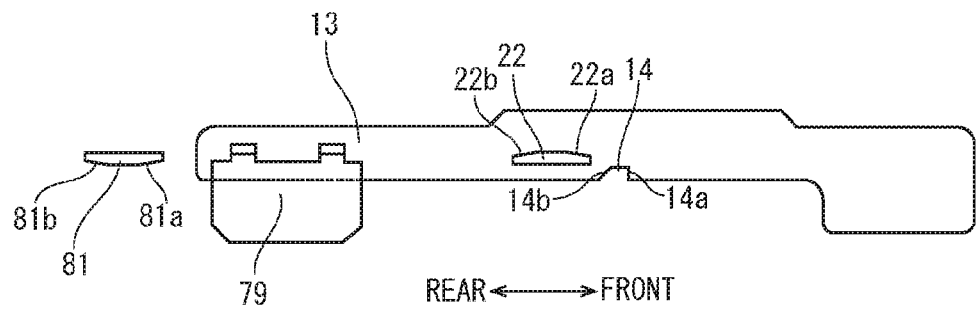
FIG. 17A is a view schematically showing the locking mechanism at the transmission position of the driving lever, in the color printer according to the embodiment of the present disclosure.
Figure 17B:
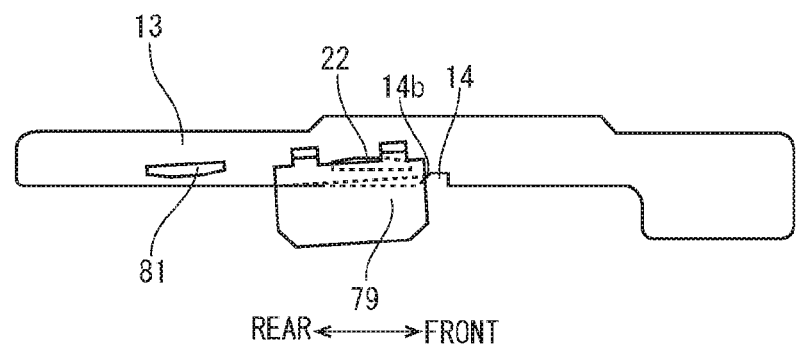
FIG. 17B is a view schematically showing the locking mechanism on the way of the driving lever sliding into the transmission release position, in the color printer according to the embodiment of the present disclosure.

In the color printer 1 having the construction mentioned above, a sliding operation of the image forming unit 20 will be described with reference to FIG. 17A to FIG. 17D and FIG. 18. FIG. 17A to FIG. 17D are views showing an engaging and disengaging operation of the locking mechanism; and FIG. 18 is a perspective view showing a state in which the upper protrusion piece of the driving lever rides over the lower protrusion piece of the image forming unit. Incidentally, in FIG. 17A to FIG. 17D, a positional relationship between the hook part 79 and the upper protrusion piece 81 is schematically shown.

In a case where the image forming unit 20 is pulled out to the pull-out position, first, the front cover 5 is turned to open the opening 3a. Next, the driving lever 58 is pulled out forward into the transmission release position to switch the coupling mechanism 56 from the transmission state into the transmission release state. At the transmission position, as shown in FIG. 17A, the hook part 79 of the driving lever 58 is engagingly locked with a portion close to a rear end of the lower edge of the corresponding slide groove 13.

If the driving lever 58 is pulled out forward, the hook part 79 then abuts against the rear end face 14b of the protrusion 14. Since the rear end face 14b of the protrusion 14 inclines in an oblique upward direction gently toward the front side, as shown in FIG. 17B, the hook part 79 is guided upward along the rear end face 14b, is lifted from the lower edge of the slide groove 13 and then moves forward along an upper edge of the protrusion 14. During the moving, if the front tapered face 81a of the upper protrusion piece 81 of the driving lever 58 abuts against the rear tapered face 22b of the lower protrusion piece 22 of the image forming unit 20, the upper protrusion piece 81 starts riding over the lower protrusion piece 22 (refer to FIG. 18).

Figure 17C:
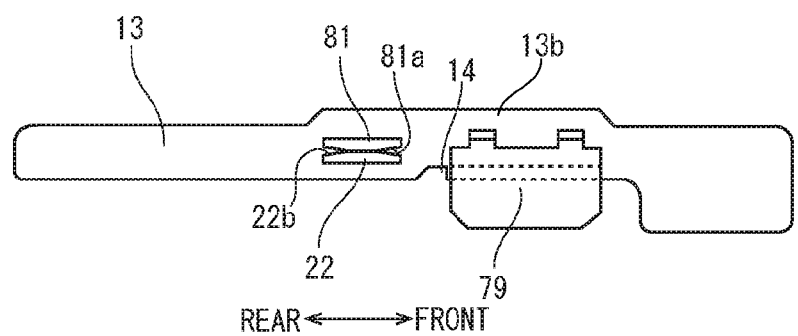
FIG. 17C is a view schematically showing the locking mechanism in an unlocked state, in the color printer according to the embodiment of the present disclosure.
Figure 18:
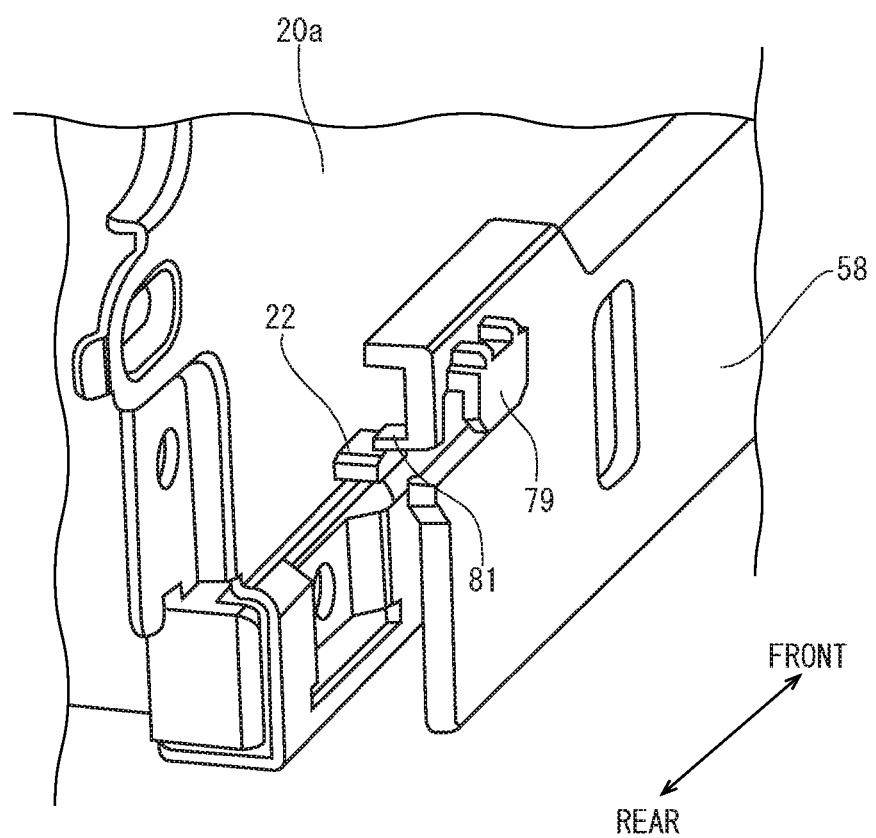
FIG. 18 is a perspective view showing a state in which the upper protrusion piece of the driving lever rides over the lower protrusion piece of an image forming unit, in the color printer according to the embodiment of the present disclosure.

If the driving lever 58 is further pulled out forward, as shown in FIG. 17C, the hook part 79 is spaced forward from the protrusion 14. In this manner, the driving lever 58 is pulled out into the transmission release position. Namely, each coupling mechanism 56 is switched into the transmission release state and then the engagement part 66c of the driving side joint 66 is spaced away from the driven side joint. Incidentally, since the upper protrusion piece 81 of the driving lever 58 rides over the lower protrusion piece 22 of the image forming unit 20, the hook part 79 is lifted from the lower edge of the slide groove 13 and then moves inside of the upper depression 13b. Although FIG. 17C shows that the hook part 79 is lifted into a horizontal posture, in actuality, there may also be a case in which the hook part 79 inclines slightly downward to the front side.

Figure 17D:
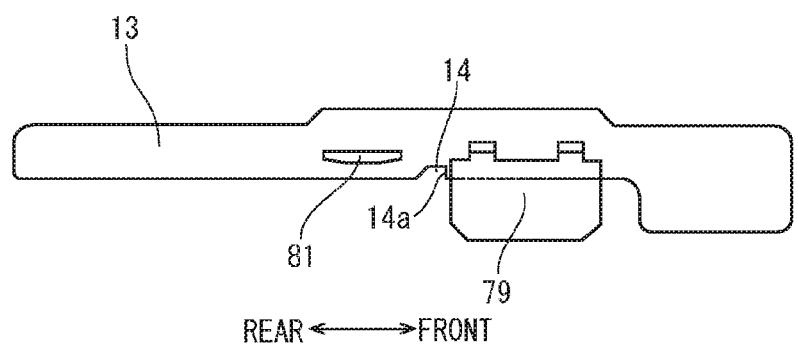
FIG. 17D is a view schematically showing the locking mechanism in a locked state, in the color printer according to the embodiment of the present disclosure.

Next, the image forming unit 20 is pulled out into the pull-out position. If the image forming unit 20 is pulled out forward along the pair of left and right rails 8, the lower protrusion piece 22 is spaced forward from the upper protrusion piece 81. Afterwards, the driving lever 58 lowers until the hook part 79 is engagingly locked with the lower edge of the slide groove 13. If the driving lever 58 thus lowers, as shown in FIG. 17D, the hook part 79 is engagingly locked with the lower edge of the slide groove 13 in front of the protrusion 14.

In a state in which the image forming unit 20 is thus pulled out into the pull-out position, if the driving lever 58 is pushed rearward, the hook part 79 abuts against the front end face 14a of the protrusion 14. Since the front end face 14a is formed at a right angle with respect to the lower edge of the slide groove 13, the rear edge of the hook part 79 is engagingly locked with the front end face 14a of the protrusion 14 and then the pushing of the driving lever 58 is prevented. That is, the switching of the coupling mechanism 56 from the transmission release state into the transmission state is prevented.

On the other hand, if the image forming unit 20 is slid along the pair of left and right rails 8 from the pull-out position into the storage position, as shown in FIG. 17C and FIG. 18, the rear tapered face 22b of the lower protrusion piece 22 of the image forming unit 20 abuts against the front tapered face 81a of the upper protrusion piece 81 of the driving lever 58, and the lower protrusion piece 22 is inserted under the upper protrusion piece 81 and then lifts the upper protrusion piece 81. Afterwards, the rear end of the driving lever 58 turns upward and then the hook part 79 moves upward higher than the protrusion 14. In this manner, the engagement of the hook part 79 with and the protrusion 14 are released, enabling the pushing of the driving lever 58.

If the driving lever 58 is then pushed, as shown in FIG. 17B, the hook part 79 moves rearward through the inside of the upper depression 13b above the protrusion 14. Afterwards, as shown in FIG. 17A, the driving lever 58 is pushed until the hook part 79 reaches close to the rear end of the slide groove 13. This switches the coupling mechanism 56 from the transmission release state into the transmission state so that each driving side joint 66 is coupled to the corresponding driven side joint of the image forming unit 20 that is slid into the storage position.

Incidentally, the driving lever 58 slides between the transmission release position pulled out forward (refer to FIG. 16) and the transmission position pushed rearward (refer to FIG. 15). The grip 75 of the driving lever 58 protrudes forward from the opening 3a of the front face of the casing 3 at the transmission release position, and is housed in the casing 3 at the transmission position.

As has been described above, in the color printer 1 of the present disclosure, in a state in which the image forming unit 20 is slid into the pull-out position, since the locking mechanism 12 prevents the sliding of the driving lever 58 configured to switch the coupling mechanism 56 from the transmission release state into the transmission state, a mistaken operation of the driving lever 58 can be prevented. Therefore, it can be prevented to occur a situation where the image forming unit 20 is attached in a state in which the engagement part 66c of the driving side joint 66 of the coupling mechanism 56 is protruded. This can prevent the members, such as the joint member, from being damaged.

Further, since the protrusion 14 that constitutes the locking mechanism 12 is formed in the slide groove 13 of the left side plate 3b, a construction configured to restrain the sliding of the driving lever 58 can be made simple. In addition, the protrusion 14 is such formed that the front end face 14a is formed at a right angle with respect to the lower edge of the slide groove 13 and the rear end face 14b is formed at an obtuse angle with respect to the lower edge of the slide groove 13. Thus, if the driving lever 58 slides from the transmission release position into the transmission position, the hook part 79 is engagingly locked with the front end face 14a to prevent the sliding of the driving lever 58. On the other hand, when the driving lever 58 slides from the transmission position to the transmission release position, the hook part 79 is guided along the inclined rear end face 14b to permit the sliding of the driving lever 58. Therefore, when the coupling mechanism 56 is switched from the transmission state into the transmission release state, the driving lever 8 can be easily slid from the transmission position to the transmission release position.

In addition, forming the lower protrusion piece 22 at the image forming unit 20 and forming the upper protrusion piece 81 at the driving lever 58 make it possible to release the locking mechanism 12 by an ordinary sliding operation of the image forming unit 20 into the storage position. Therefore, there is no need to provide a dedicated mechanism for releasing the locking mechanism 12 or to add another member, and it is possible to simplify a construction configured to restrain the sliding of the driving lever 58.

As described previously, in order to switch the coupling mechanism 56 from the transmission release state into the transmission state, it is necessary to carry out the work of pushing the driving lever 58 into the transmission position subsequent to the sliding the image forming unit 20 to the storage position.

Figure 19A:
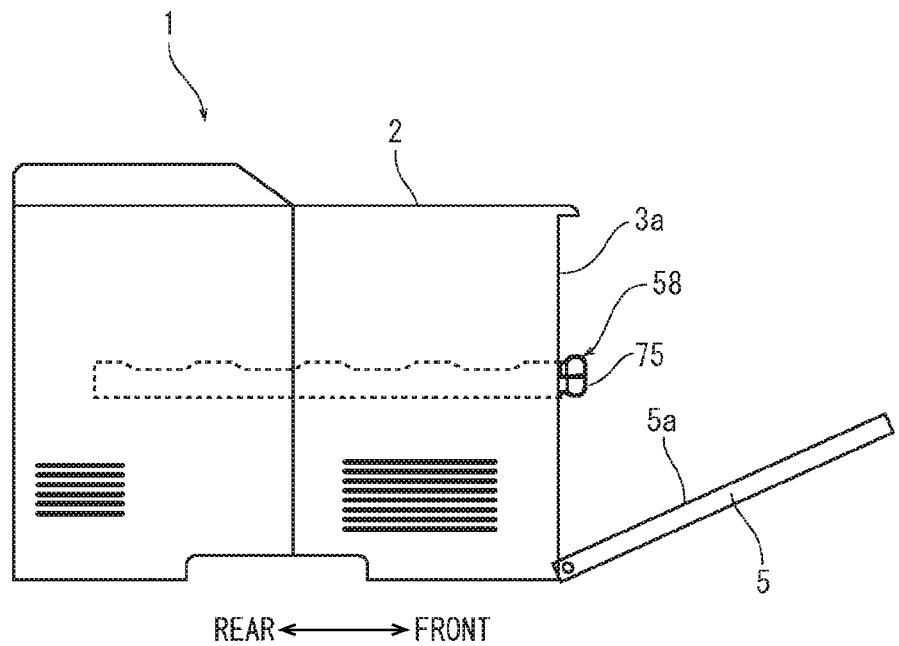
FIG. 19A is a side view showing the driving lever slid into the transmission release position in a state in which a covering member turns to open an opening, in the color printer according to the embodiment of the present disclosure.
Figure 19B:
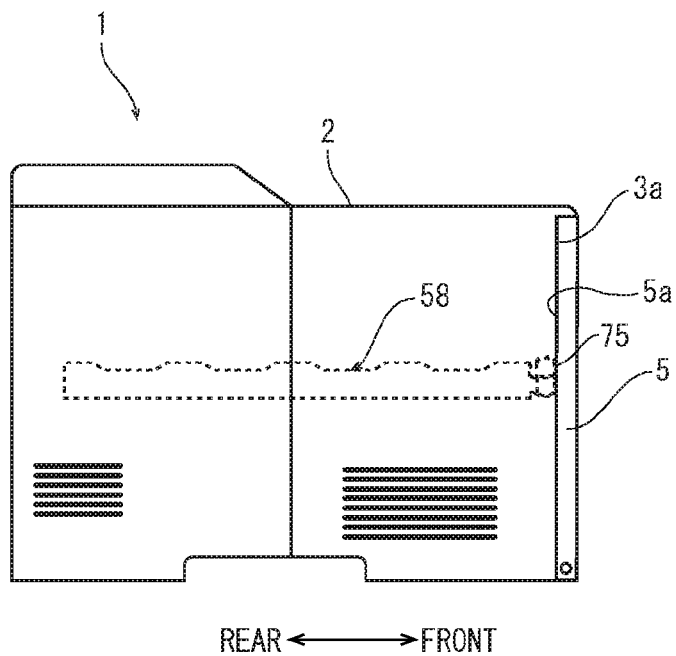
FIG. 19B is a side view showing the driving lever slid into the transmission position in a state in which the covering member turns to close the opening, in the color printer according to the embodiment of the present disclosure.

Next, with reference to FIG. 19A and FIG. 19B, a case in which one fails to carry out the work of pushing the driving lever 58 into the transmission position will be described. FIG. 19A and FIG. 19B are side views each showing the pushing operation of the driving lever, wherein FIG. 19A shows the driving lever in a state in which the cover member turns to open the opening, and FIG. 19B shows the driving lever in a state in which the cover member turns to close the opening.

In a case where one fails to carry out the work of pushing the driving lever 58 into the transmission position, as shown in FIG. 19A, the grip 75 of the driving lever 58 remains protruded forward from the opening 3a. However, as shown in FIG. 19B, if the front cover 5 is turned to close the opening 3a, the grip 75 abuts against the abutment face 5a of the front cover 5 to be pushed in accompanied with the turning of the front cover 5. In this manner, the driving lever 58 is pushed into the transmission position.

Thus, even in a case where one fails to carry out the work of pushing the driving lever 58, one does not fail to carry out the work of turning the front cover 5 to close the opening 3a; and therefore, the driving lever 58 can be pushed into the transmission position by turning the front cover 5 to switch the coupling mechanism 56 into the transmission state.

Incidentally, although the embodiment was described as to the case in which the grip 75 of the driving lever 58 protrudes forward from the opening 3a of the casing 3 at the transmission release position, the grip 75 does not always need to protrude forward from the opening 3a. For example, if the driving lever 58 does not protrude from the aperture 3a at the transmission release position, a protrusion may be provided at the abutment face 5a of the front cover 5. In this case, when the front cover 5 is turned so as to close the opening 3a, the grip 75 can be pushed by the protrusion.

In addition, it may be that the front cover 5 and the driving lever 58 are coupled to each other so as to interlock the turning of the front cover 5 and the pushing of the driving lever 58 with each other. However, in a manufacturing line or the like, it is necessary to carry out a checking work of the operation of the driving lever 58 in a state in which the front cover 5 is turned to open the opening 3a. Therefore, it is preferable that the front cover 5 and the driving lever 58 be not directly coupled with each other.

Further, a biasing member configured to bias the driving lever 58 into the transmission position may be provided. In this case, it is possible to facilitate the work of pushing the driving lever 58.

Although the embodiment was described as to the case in which the driven unit is the image forming unit 20, the present disclosure can be applied to another unit in which a driving force is supplied to a rotor from an external driving source by a coaxial driving transmission manner.

The embodiment was described in a case of applying the configuration of the present disclosure to the color printer 1. On the other hand, in another embodiment, the configuration of the disclosure may be applied to another image forming apparatus, such as a copying machine, a facsimile or a multifunction peripheral, except for the printer 1.

While the preferable embodiment and its modified example of the sheet feeding device and the image forming apparatus of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment of the disclosure as mentioned above.

What is claimed is:

1. An image forming apparatus comprising:
   a driven unit configured to be supported so as to slide between a storage position to be stored in a casing and a pull-out position to be pulled out outside of the casing, the driving unit being driven by a driving force from a driving source;
   a coupling mechanism provided between the driven unit and the driving source and configured to be switched between a transmission state in which the driven unit and the driving source are coupled to each other to transmit the driving force to the driven unit and a transmission release state in which the driven unit and the driving source are decoupled from each other to release the transmission of the driving force to the driven unit;
   a driving lever to be supported so as to slide between a transmission position at which the coupling mechanism is switched into the transmission state from the transmission release state and a transmission release position at which the coupling mechanism is switched into the transmission release state from the transmission state; and
   a locking mechanism configured to prevent the sliding of the driving lever from the transmission release position toward the transmission position,
   wherein the locking mechanism has:
   a protrusion protruding upward from a lower edge of a sliding groove extending in a horizontal direction provided in the casing; and
   a hook part provided at the driving lever and configured to engage with the lower edge of the sliding groove,
   wherein the engagement of the hook part with the protrusion prevents the sliding of the driving lever from the transmission release position to the transmission position, wherein
   the sliding of the driven unit from the pull-out position into the storage position moves the driving lever upward with respect to the casing to move the hook part upward from the protrusion and then to permit the sliding of the driving lever from the transmission release position into the transmission position.

2. The image forming apparatus according to claim 1 comprising:
   a lower protrusion piece provided at the driven unit and protruded toward the driving lever; and
   an upper protrusion piece provided at the driving lever and configured to ride over the lower protrusion piece,
   wherein when the driven unit slides from the pull-out position into the storage position, the upper protrusion piece rides over the lower protrusion piece to move the driving lever upward with respect to the casing and then to release the locking mechanism so as to permit the sliding of the driving lever from the transmission release position into the transmission position.

3. The image forming apparatus according to claim 2,
   wherein the lower protrusion piece and the upper protrusion piece respectively have abutment faces which abut against each other when the driven unit slides from the pull-out position into the storage position, and
   the abutment face of the lower protrusion piece is an upward inclined tapered face and the abutment face of the upper protrusion piece is a downward inclined tapered face.

4. The image forming apparatus according to claim 1,
   wherein the protrusion has a front end face on a front side and a rear end face on a rear side in a sliding direction of the driving lever from the transmission release position toward the transmission position, and
   the front end face is formed at a right angle with respect to the lower edge of the sliding groove and the rear end face inclines at an obtuse angle with respect to the lower edge of the sliding groove.

5. The image forming apparatus according to claim 2, comprising a cover configured to open and close an opening through which the driven unit is pulled out and pushed in,
   wherein the cover is formed with an abutment part configured to abut against the driving lever when the opening is closed and then to slide the driving lever from the transmission release position into the transmission position.

6. The image forming apparatus according to claim 1, wherein a coupling direction in which the driven unit is coupled to the driving source between the driving source and the driven unit in the coupling mechanism is orthogonal to a sliding direction in which the driven unit is slid between the storage position and the pull-out position.

7. The image forming apparatus according to claim 1,
   wherein the driven unit includes:
   a photosensitive drum provided to be rotated around a rotating shaft;
   a driving force input shaft arranged in parallel to the rotating shaft; and
   a development device provided to be rotated by coupling to the driving force input shaft via a gear train and configured to form a toner image on the photosensitive drum,
   wherein the coupling mechanism is configured to couple and decouple the driving source and at least one of the rotating shaft and the driving force input shaft.

* * * * *